United States Patent [19]

Paquet et al.

[11] Patent Number: 5,138,883
[45] Date of Patent: Aug. 18, 1992

[54] ANALOG TORQUE REBALANCE LOOP FOR A TUNED ROTOR GYROSCOPE

[75] Inventors: Francois Paquet, Nepean; Michael F. Vinnins, Richmond; Lloyd Gallop, Kanata, all of Canada

[73] Assignee: Minister of National Defence of Her Majesty's Canadian Government, Ottawa, Canada

[21] Appl. No.: 589,533

[22] Filed: Sep. 28, 1990

[30] Foreign Application Priority Data

Sep. 29, 1989 [CA] Canada .................................. 615093

[51] Int. Cl.⁵ .............................................. G01P 9/02
[52] U.S. Cl. ........................................ 73/504; 74/5.4
[58] Field of Search .................... 73/504, 510; 74/5 F, 74/5.4

[56] References Cited

U.S. PATENT DOCUMENTS 4,986,139 1/1991 Rennie ................................... 74/5.4

Primary Examiner—John E. Chapman
Attorney, Agent, or Firm—Larson and Taylor

[57] ABSTRACT

A rebalance loop for controlling a dry tuned rotor gyroscope having a rotor moveable about two orthogonal axes, a first pickoff associated with one of the axes for producing an electrical error signal when a rate is applied to one of the axes, a second pickoff associated with the other of the axes for producing an electrical error signal when a rate is applied to that axis and a pair of torquer coil adapted to receive electrical control signals from the rebalance loop and apply torques to the rotor about the two axes for correcting errors detected by the pickoffs. The rebalance loop comprises a first direct-axis loop which receives an error signal produced by one of the pickoffs and produces a first amplified error signal, a second direct-axis loop which receives an error signal produced by the other of the pickoffs and produces a second amplified error signal, a first cross-axis loop for amplifying the error signal produced by the one of the pickoffs and adapted to produce a first correction signal, a second cross-axis loop for amplifying the error signal produced by the other of the pickoffs and adapted to produce a second correction signal, a first summing junction for adding the first correction signal to the second amplified error signal for producing a first torque correction signal, and a second summing junction for adding the second correction signal to the first amplified error signal for producing a second torque correction signal.

14 Claims, 8 Drawing Sheets

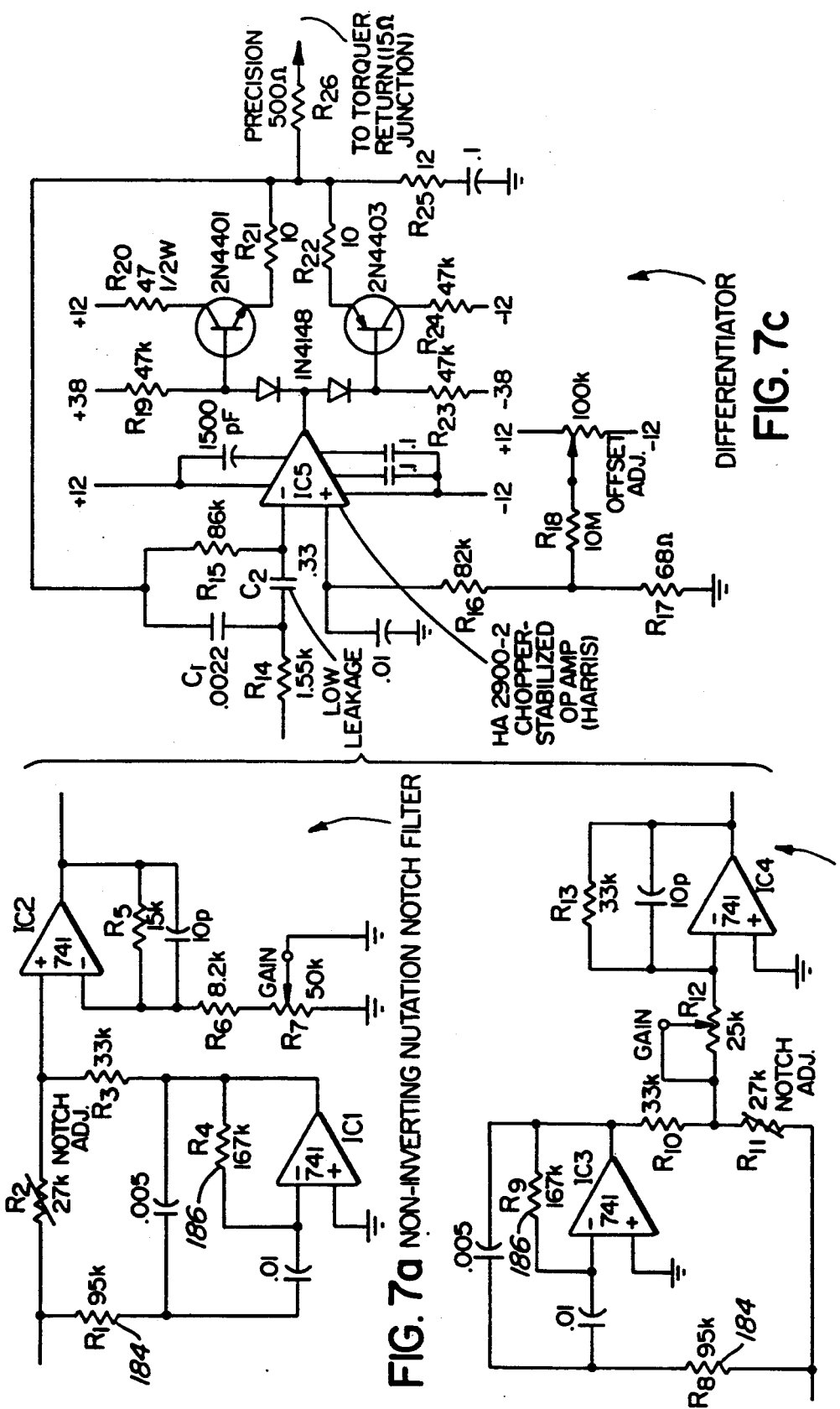

ANALOG TORQUE REBALANCE LOOP FOR A TUNED ROTOR GYROSCOPE

The present invention relates, in general, to an electronic gyroscope control circuit and, more specifically, to an electronic rebalance loop for a two-degree-of-freedom, dry tuned rotor gyroscope intended for strapdown applications.

BACKGROUND OF THE INVENTION

Two-degree-of-freedom, dry tuned rotor gyroscopes are well known. In order to be put into practical use, an electrical control system, known as a "rebalance loop", must be provided in order to control the gyroscope over its dynamic range and provide a precise output measurement of angular rate of the gyroscope rotor about each of the rotor axes. The dynamic range of such an instrument may vary from 0.01 degree/hour to greater than 1 radian/second requiring electrical rebalance currents ranging from several microamperes to several hundred milliamperes. In addition, the dry tuned rotor gyroscope is, by nature, an instrument which is susceptible or sensitive to angular acceleration. A rebalance loop must compensate for angular acceleration if full gyroscope performance is to be realized. In typical dry tuned rotor gyroscopes, flexures are used to support the rotor. Flexures are small metallic blades supporting the rotor and arranged between the motor shaft and the rotor in such a was as to give the rotor freedom of angular motion in two orthogonal axes. In a strapdown arrangement, the gyros are secured to the body axes of the vehicle and are required to sense the full range of dynamics of the vehicle. The strapdown arrangement greatly reduces the mechanical complexity and cost of the gyroscope and therefore of the system, such as an inertial navigation system for example, with which it is used, but increases the electronic complexity with respect to the rebalance electronics. The gyros are provided with a "pickoff" for each degree of freedom or axis of the gyro for producing an electrical signal in response to angular motion applied to that axis and a "torquer" associated with each such axis for applying a compensating torque about that axis. The pickoff signals are amplified and delivered to the rebalance loop which processes the signal and produces a torquer current which is delivered to the torquer. This causes the torquer to apply a torque to the rotor so as to maintain the rotor in a "null" position. Rebalance loops typically include a direct-axis loops or circuits which receive the signal from the pickoff associated with one axis and delivers a torquer current to the torquer associated with the other axis.

Several types of strapdown rabalance loops are known including pulsed loops, of either the binary or pulse width modulated types, and analog loops. For lower performance instruments and systems, any of these types of rebalance loops can be used if suitably modified to suit the specific gyroscope of interest. High performance, strapdown, inertial gyroscopes having a wide dynamic range and effects due to acceleration require modified rebalance loop designs. Most, if not all, analog rebalance loops use the same principle of operation to generate rate information from the torquing current and that is by allowing the torquing current to flow through a precision resistor to obtain a voltage signal that is proportional to the torque. Usually, the precision resistor is in the "return" lead of the torquer coils so that one node of that resistor can be referenced to ground. A rebalance loop is a type of servo control that is inherently unstable unless the loop contains phase compensation or some form of control scheme. The most simple scheme of phase compensation is a phase lag in the direct-axis loop and is used in analog as well as digital rebalance loops. Another scheme of which the inventors are aware, although it is not known whether it is used in rebalance loops of the type with which the present invention is considered, is the so-called "cross-coupled loop" which uses cross-axis circuits for the purpose of making the loop stable. The cross-coupled loop uses differentiators as cross-axis circuits only to stabilize nutation but do not provide compensation for angular acceleration.

SUMMARY OF THE INVENTION

The present invention provides a high resolution analog rebalance analog rebalance loop which is capable of providing a precise output measurement of angular rate of the gyroscope rotor about each of the rotor axes and which provides a more benign environment for the gyroscope than a pulsed rebalance loop. More specifically, the present invention provides a phase lag rebalance loop having cross-axis circuits which are operable to remove torque currents caused by the transverse inertia of the gyro rotor from the precision resistor, the resistor from which the rate information is obtained. Known cross-coupled loops were neither intended nor are they capable of doing this because the effective transverse inertia at nutation frequency would be reversed twice, once from the phase lag introduced into the signal and a second time by the cross-coupled circuit itself. This would render the loop unstable. In order to function properly, the cross-axis circuit must be such as to act only on frequencies in the closed loop bandwidth of the system and the nutation stability must not be affected.

In accordance with the present invention, there is provided a rebalance loop for controlling a dry tuned rotor gyroscope having a rotor moveable about two orthogonal axes, a first pickoff associated with one of the axes for producing an electrical error signal when a rate is applied to one of the axes, a second pickoff associated with the other of the axes for producing an electrical error signal when a rate is applied to that axis and torquer coils adapted to receive electrical control signals from the rebalance loop and apply torques to the rotor for correcting errors detected by the pickoffs. The rebalance loop comprises a first direct-axis loop adapted to receive an error signal produced by one of the pickoffs and produce a first amplified error signal, a second direct-axis loop adapted to receive an error signal produced by the other of the pickoffs and produce a second amplified error signal, a first cross-axis loop for amplifying the error signal produced by the one of the pickoffs and adapted to produce a first correction signal, a second cross-axis loop for amplifying the error signal produced by the other of the pickoffs and adapted to produce a second correction signal, a first summing junction for adding the first correction signal to the second amplified error signal for producing a first torque correction signal, and a second summing junction for adding the second correction signal to the first amplified error signal for producing a second torque correction signal.

BRIEF DESCRIPTION OF THE DRAWINGS

These and other features of the invention will become more apparent from the following description in which reference is made to the appended drawings, wherein:

FIG. 7a–c is an electrical schematic of cross-axis amplifiers which may be employed in the embodiment of FIG. 3.

DESCRIPTION OF THE PREFERRED EMBODIMENTS

Figure 1:
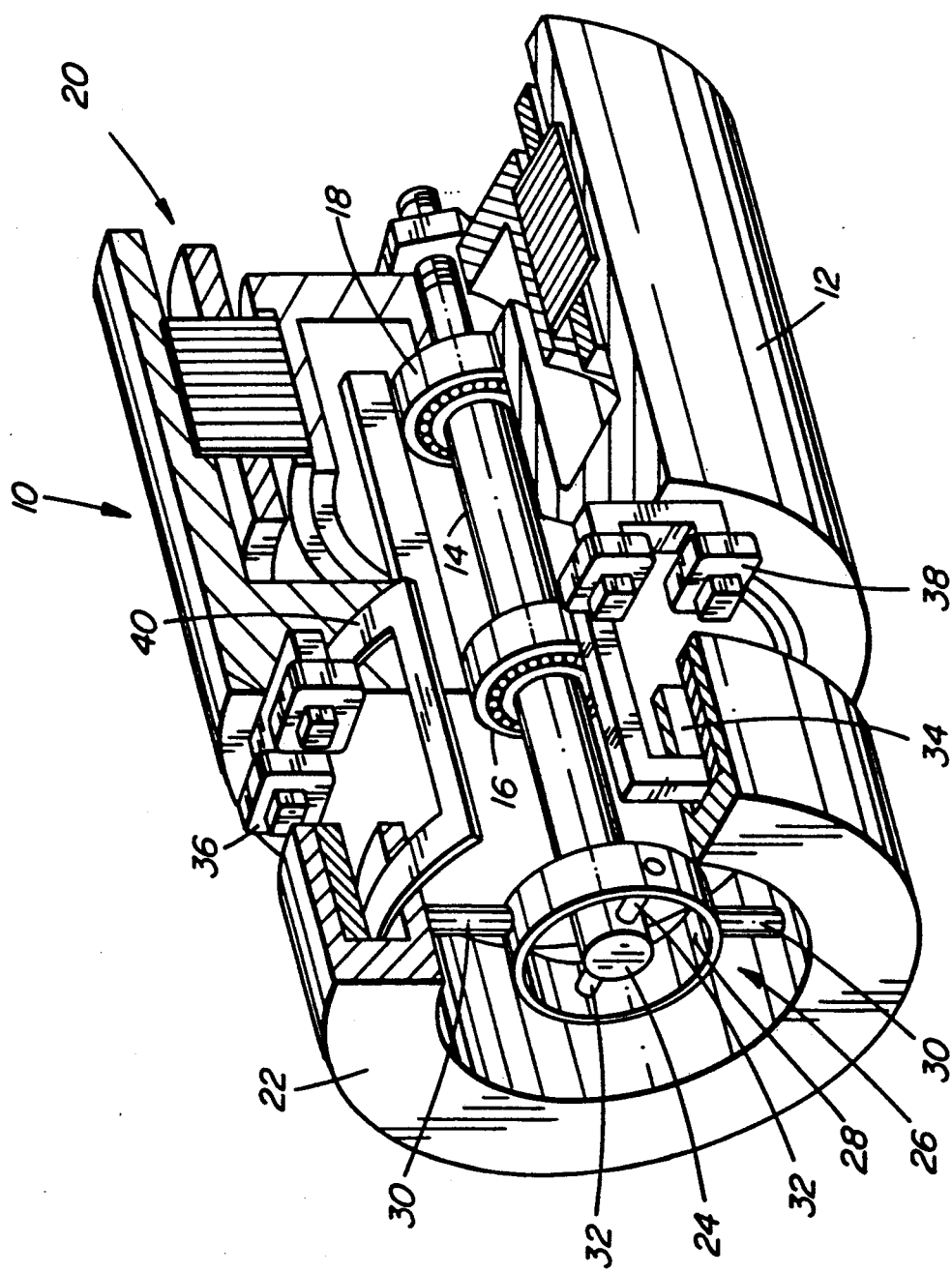
FIG. 1 is a partially broken perspective view of a typical two-degree-of-freedom, dry tuned rotor gyroscope.

With reference to FIG. 1 of the drawings, a typical two-degree-of-freedom, dry tuned rotor gyroscope 10 comprises a housing or body 12 in which a shaft 14 is secured for rotation in bearings 16 and 18. The drive shaft is driven by a motor 20 also secured within the housing. A rotor 22 is secured to one end 24 of the shaft by a flexure assembly, generally designated by reference numeral 26, which includes a gimbal ring 28. A first pair of coaxial half-axles 30 extending perpendicularly of the drive shaft are rotatably secured in the rotor and gimbal ring as shown and define a first axis and degree of freedom of the rotor and a second pair of coaxial half-axles 32 extending perpendicularly of the drive shaft and the first pair of half axles are rotatably secured in the gimbal ring and the drive shaft as shown and define a second axis and degree of freedom of the rotor. It is to be understood that the illustration of axles 30 and 32 is intended to be functional only. In reality, the axles are flexures which are an integral part of a gimbal ring and rotor and are free to flex in such an orientation as to be the equivalent to the axles illustrated in FIG. 1. Thus both axles allow two degrees of freedom for the rotor.

The rotor is formed with a circumferential slot 34 in which a permanent magnet ring is secured for rotation with the rotor and in which torquer coils 40 are disposed. A pair of pickoff coils 36 and 38 are secured to the housing, intermediate the housing and rotor, in orthogonal relation to one another and each is operable to sense angular rates applied to one of the input axes of the gyroscope case and provide corresponding error signals to a rebalance loop. As is well known to those skilled in this art, a pickoff coil is a device which produces an output signal, generally a voltage, as a function of the angular displacement of the rotor relative to the gyro case or body. The pickoff signals are amplified by sensitive amplifiers, not shown, and delivered to a rebalance loop as explained later.

Figure 6:
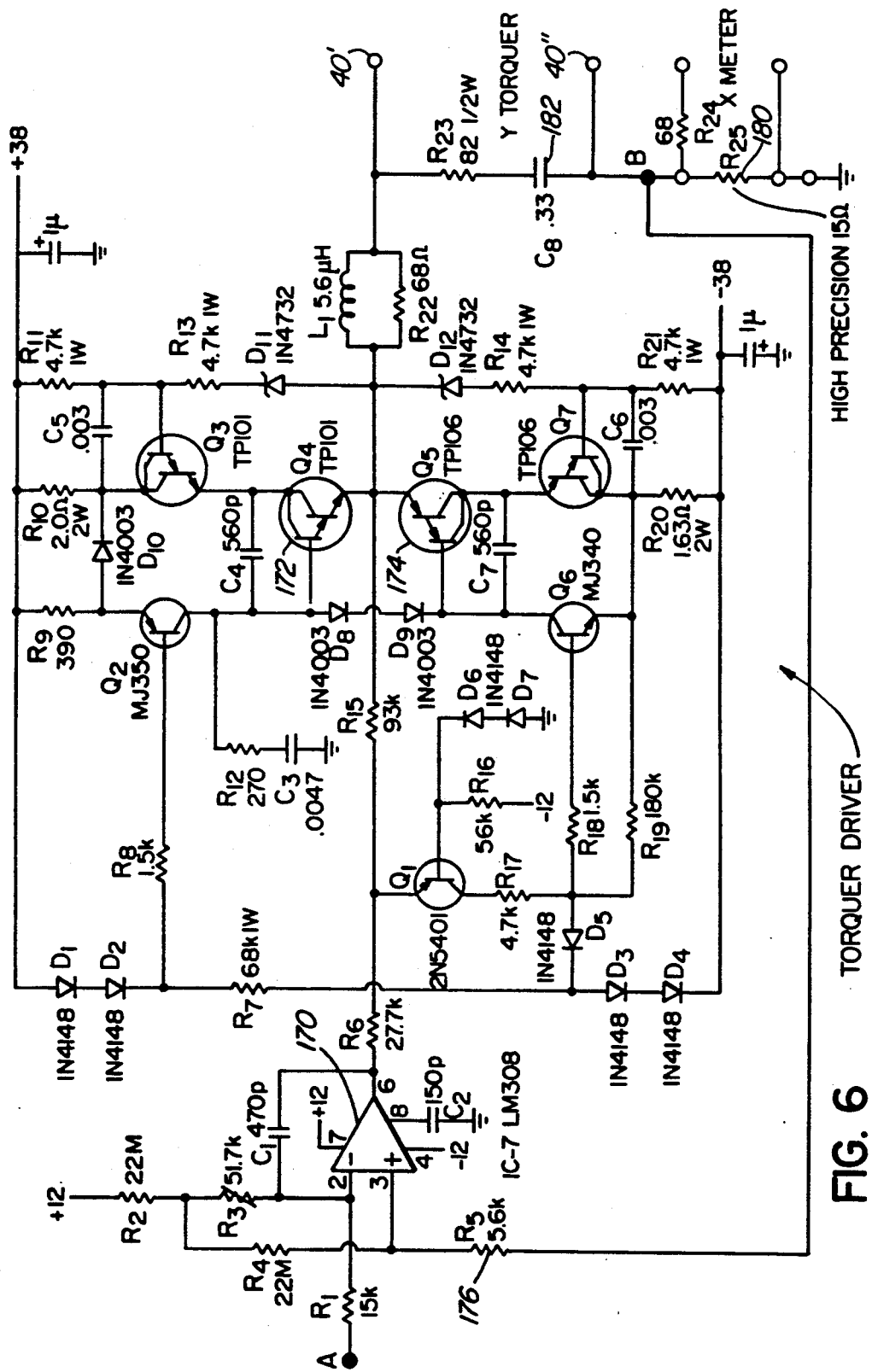
FIG. 6 is an electrical schematic of a torquer driver employed in the embodiment of FIG. 3.
Figure 8A:
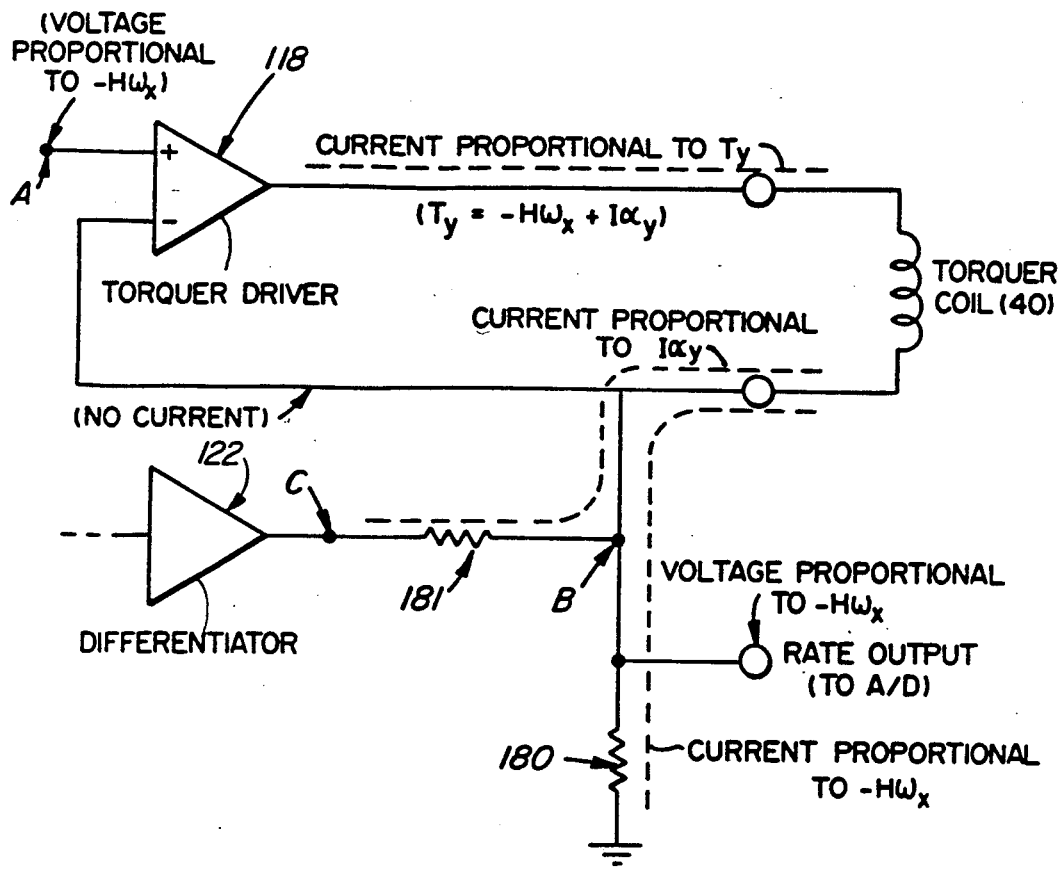
FIGS. 8a and 8b are block diagram schematic illustrating the operation of a portion of terminal portions of the cross-axis and direct-axis amplifiers.
Figure 8B:
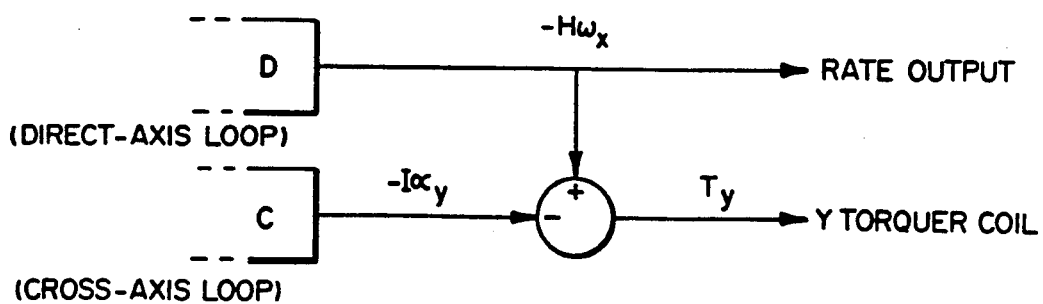

A pair of torquer coils 40, one of which is shown in FIG. 1, are adapted to receive torquer currents from the rebalance loop and apply torques to the rotor so as to maintain the rotor in a "null" position. As shown in FIGS. 6 and 8, the torquer currents are delivered to an output terminal 40' and returned to an input terminal 40". As is known to those skilled in this field, a torquer coil is a device which exerts torque on the rotor in response to a command signal initiated by the pickoff coils. The amount of current required to maintain a null position is directly proportional to the angular rate applied to the gyroscope.

In a strapdown arrangement, the gyros are secured to the body axes of the vehicle and are required to sense the full range of dynamics of the vehicle. This arrangement greatly reduces the mechanical complexity and cost of an inertial navigation system but increases the electronic complexity of the rebalance electronics. The linearity and stability of the gyroscope/rebalance loop combination are of tantamount importance in achieving the desired performance from the instrument.

Figure 2:
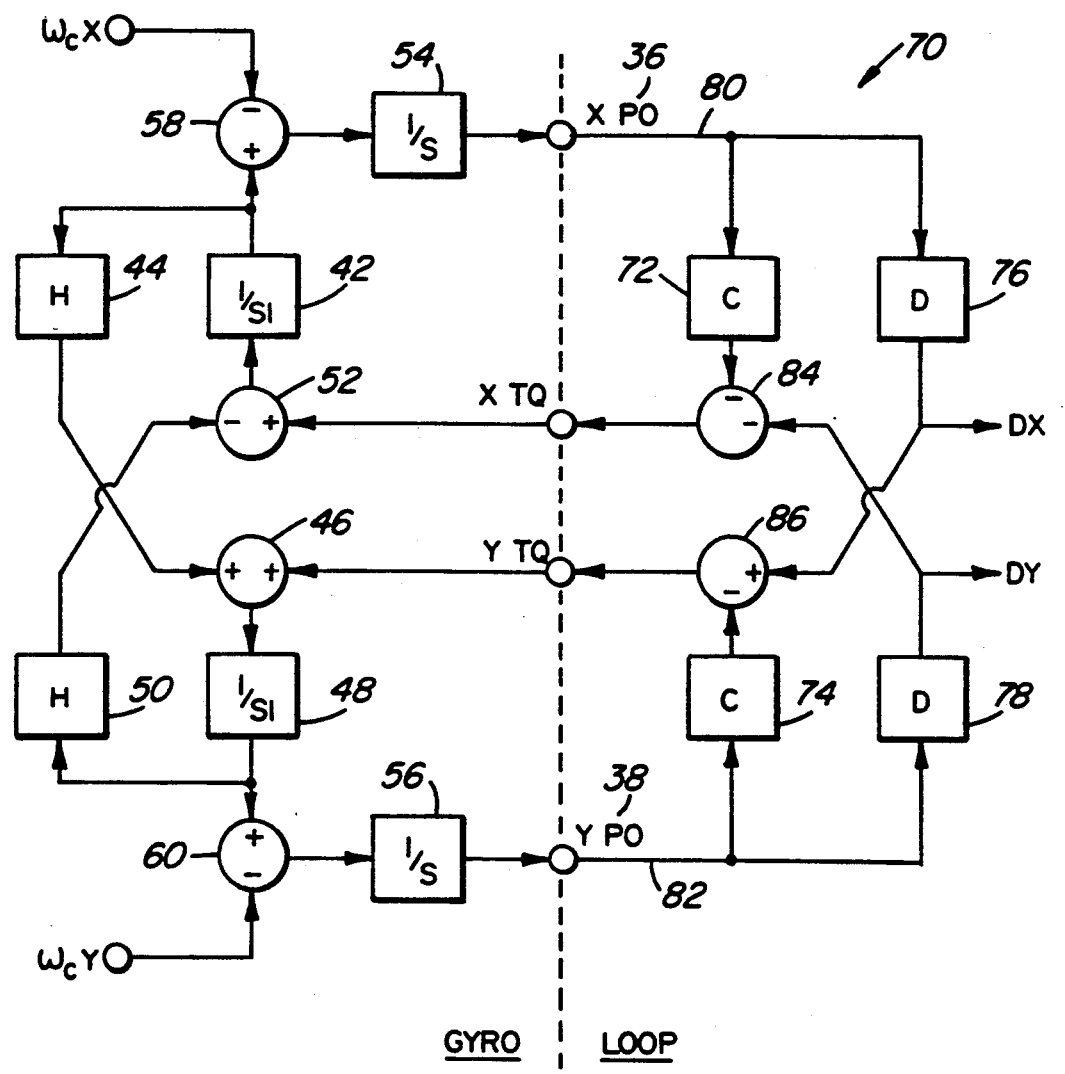
FIG. 2 is a block diagram representation of the gyroscope dynamics and of an analog rebalance loop according one embodiment of the present invention.

With particular reference to FIG. 2, the left side of the figure is a Laplace Transform representation of the gyroscope and the right side of the figure is the rebalance loop. The "FIG. 8" loop formed by blocks 42,44,46,48,50 and 52 represent the "gyro dynamics" or "Nutation Loop", where the natural frequency of undamped oscillation is 2 (H/I) Hz and the damping factor can be assumed to be zero. "S" is the Laplace Transform operator, "H" is the angular momentum and "I" is the transverse moment of inertia. Blocks 54 and 56 represent the integrating action of pickoff coils 36 and 38. The input to these blocks is angular rate while the outputs therefrom is angular position. Summing points 58 and 60 are an integral part of the pickoff coils since the pickoff coils are secured to gyroscope housing 12. Negative inputs to summing points 58 and 60 result from motion of the housing. Positive inputs result from rotor reaction. The output of the rebalance loop is a pair of torquer currents which, in FIG. 2, are applied to summing points 46 and 52. The other inputs applied to summing points 46 and 52 are torque the gyro rotor applies on itself on one axis as a result of an angular rate of the other axis.

With reference to the right side of FIG. 2, the rebalance loop 70 will be seen to be comprised of a pair of cross-axis loops 72 and 74 and a pair of direct-axis loops 76 and 78. In FIG. 2, C is used to denote a cross-axis loop and D a direct-axis loop. A cross-axis loop is one which derives its input from a pickoff coil which senses angular rate about one axis and delivers its output, a torquer current, to the torquer coil which applies a torque about the same axis. On the other hand, a direct-axis loop is one which derives its input from a pickoff coil which senses angular rate about one axis and delivers its output, a torquer current, to the torquer coil which applies a torque about the other axis. This arrangement is based on the fundamental law of precession of a gyroscope which is defined as a rotation ("ω") of the spin axis produced by a torque ("T") applied about an axis mutually perpendicular to the spin axis and the axis of the resulting rotation. In other words, "x" precession is produced by "y" torque.

The signal from pickoff coil 36 is applied to the input of each of cross-axis loop 72 and direct-axis loop 76 via conductor 80 while the pickoff signal from pickoff coil 38 is applied to the input of each of cross-axis loop 74 and direct-axis loop 78 via conductor 82. The outputs of cross-axis loops 72 and 74 are signals proportional to the angular acceleration of the rotor about the two gyroscope axes mentioned earlier while the outputs of direct-axis loops 76 and 78 are signals proportional to angular rate of the rotor. The output of cross-axis loop 72 and of direct-axis loop 78 are applied to a summing junction 84 which is electrically coupled to a torquer coil where it is translated to a torque about one gyroscope axis. Similarly, the output of cross-axis loop 74 and of direct-axis loop 76 are applied to a summing junction 86 which is electrically coupled to a torquer coil where it is translated to a torque about the other gyroscope axis.

Figure 3:
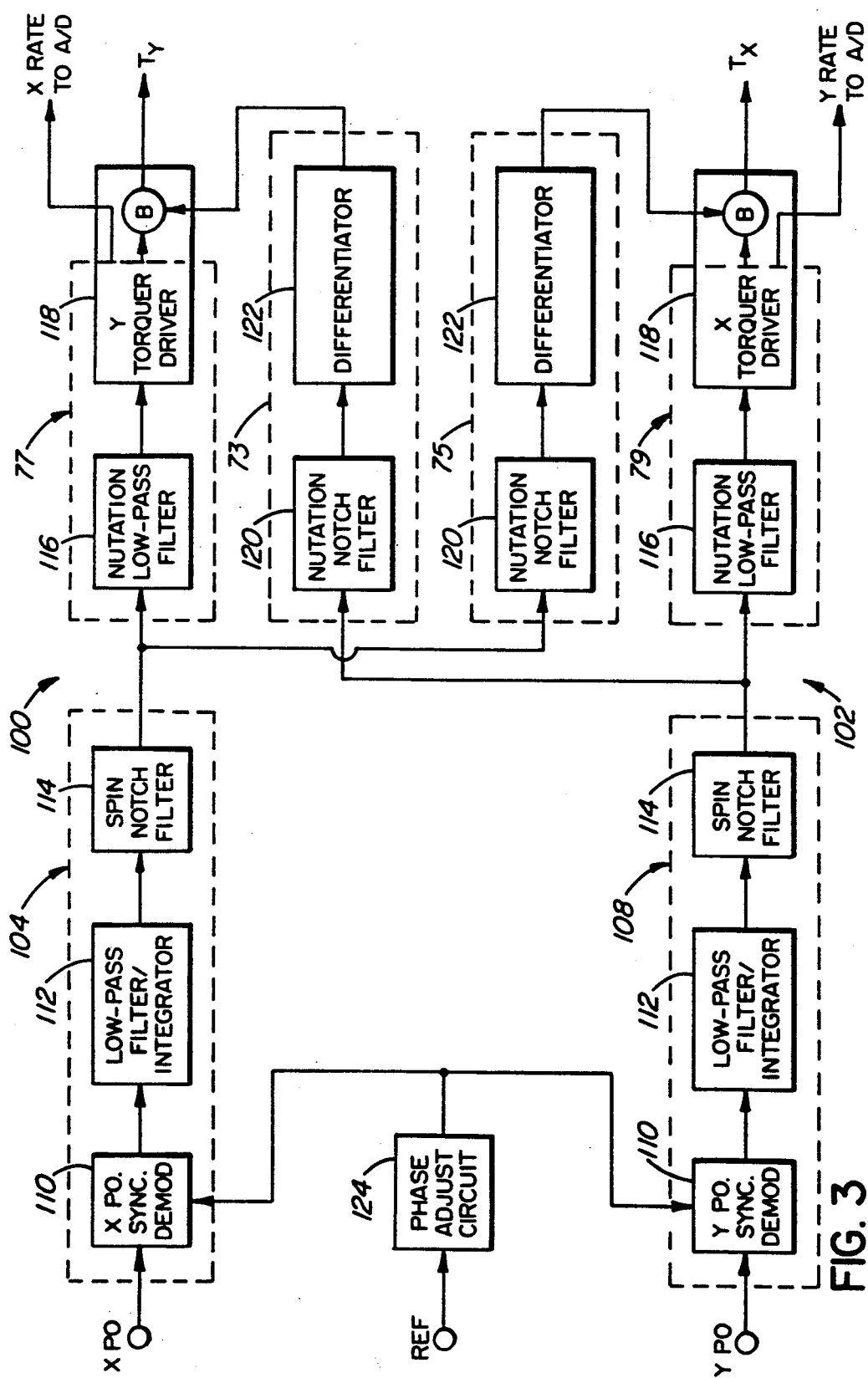
FIG. 3 is a more detailed block diagram representation of an rebalance loop according to one embodiment of the present invention.

FIG. 3 diagrammatically illustrates the rebalance loop of the present invention in more detail. Thus, with reference to FIG. 3, rebalance loop 70 will be seen to be comprised of a first rebalance loop portion 100 arranged to receive an "x" pickoff signal and deliver a "y" torquer current and a second rebalance loop portion 102 arranged to receive a "y" pickoff signal and deliver an "x" torquer current. Both portions include common front-end circuits 104 and 108, respectively, each of which includes, in series connection, a pickoff signal demodulator 110, a demodulator low pass filter/integrator 112 (FIG. 4) and a spin notch filter 114 (FIG. 5). The output of filter 114 of each loop portion is then delivered to its own direct-axis circuit which includes a nutation low-pass filter 116 and a transconductance amplifier 118 (FIG. 6) and to the cross-axis circuit of the other loop which includes nutation notch fillers 120 and a differentiator 122 (FIG. 7). One nutation notch filter is inverting, the other is non-inverting and, depending upon the application, cross-axis circuits 73 and 75 may not be employed. The rebalance loop also includes a phase adjust circuit 124.

Figure 4:
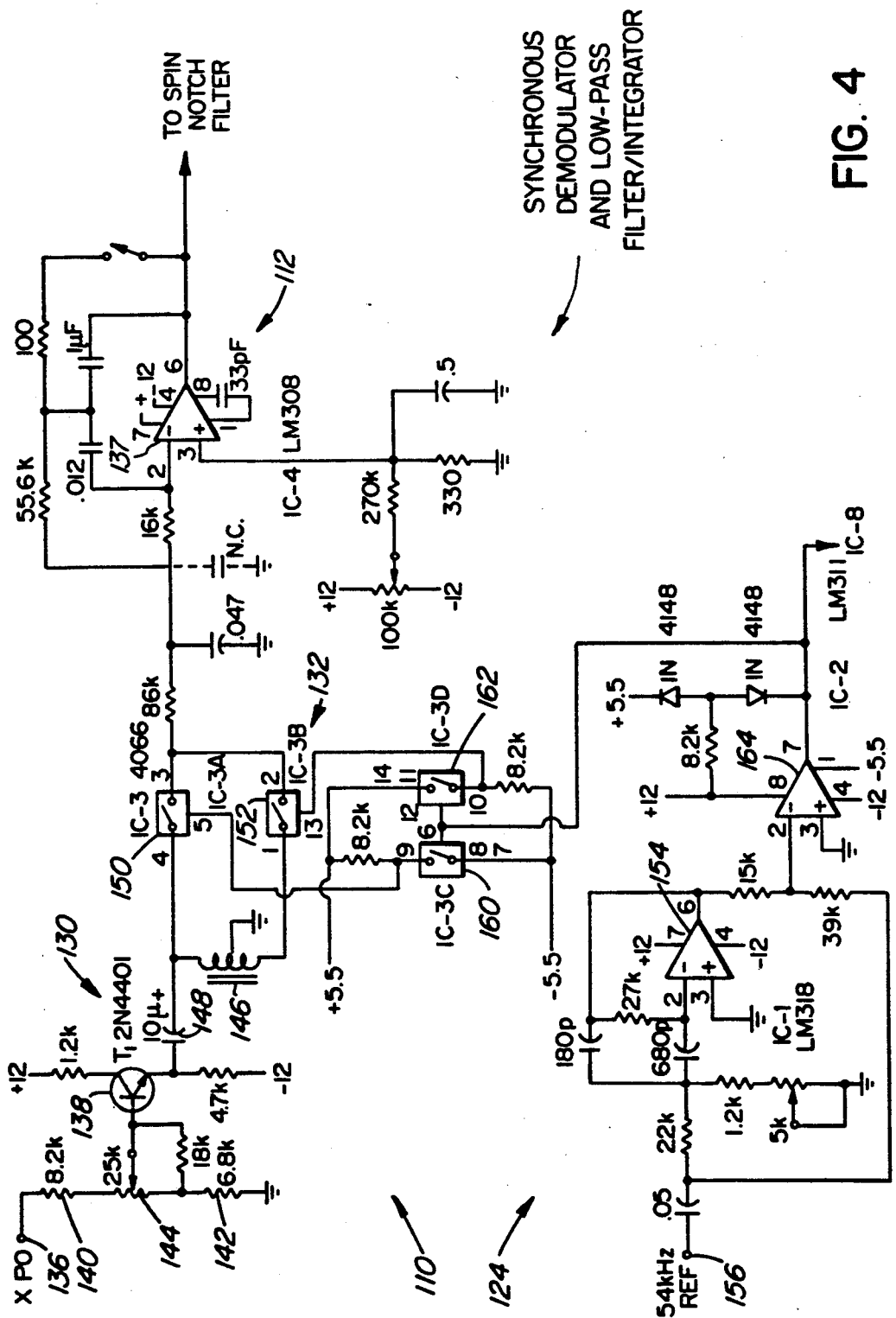
FIG. 4 is an electrical schematic of a synchronous demodulator and low pass filter/integrator employed in the embodiment of FIG. 3.
Figure 5:
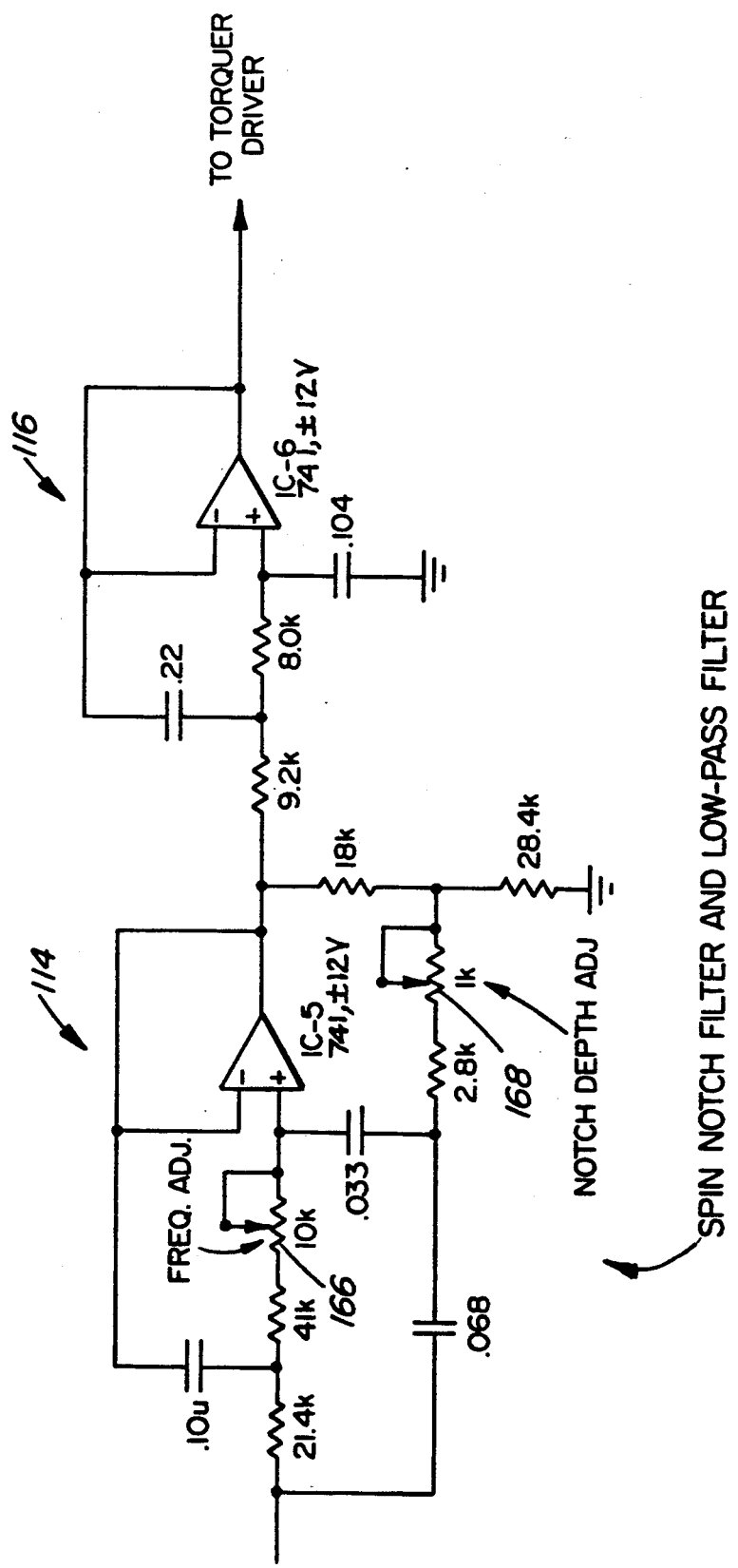
FIG. 5 is an electrical schematic of a spin notch filter and low-pass filter employed in the embodiment of FIG. 3.

With reference to FIG. 4, synchronous demodulator 110 effectively multiplies the pickoff signal by a square wave (factor +1 and −1) supplied by phase adjust circuit 124. The square-wave from the phase adjust circuit "flips" the pickoff signal, alternately, by switching means, between the two complementary sine wave signals supplied by phase splitting transformer 146 at the rate of the pickoff reference frequency. The result is a full-wave rectification. The simpler form of a full-wave rectifier with diodes, or an absolute value converter, would not work since the rectified signal must have a bipolar range. The gain of the demodulator is set to 25 volt DC/volt RMS of pickoff. Demodulator 110 is comprised of an AC coupled amplified 130, a full wave synchronous rectifier 132 and a low pass filter/integrator 112.

Low pass filter/integrator 112 not only smooths out the demodulated pickoff signal, but also provides almost half of the phase lag in the loop. The remaining part of the phase lag is produced by a nutation low-pass filter, discussed later. The phase lag is necessary for nutation stability. The phase lag is produced in two steps so that the phase response is such that the phase shift at frequencies in the closed loop bandwidth is smaller. This is desirable for higher bandwidth. The response of the filter part of the circuit is that of a second order low-pass filter with a natural frequency of 198 Hz and a damping ratio of 0.6. The amount of phase lag required depends on the gyro and the phase lag in the rest of the loop, and can be adjusted t,y adjusting the 16 KΩ resistor. The circuit is designed so that, by the proper selection of resistance of this resistor, the natural frequency can be adjusted without significantly affecting the damping ratio, within certain limits. The integrating part cf the circuit (112 in FIG. 4) is a capacitor (1 μF) placed in series with the feedback resistor (55.6 KΩ. The capacitor is a low leakage type (polyester). The cut-off frequency of the integrating response is about 3 Hz. The Laplace transform analysis for this circuit shows that the response of this circuit is identical to the response of a circuit in which the filter function and the integrating function would be performed separately. Using the same integrated circuit to accomplish the two functions reduces the sources of DC instabilities. The DC drifts in subsequent circuits do not affect the performances of the loop (except the differentiator). The DC drifts in the demodulator and in the low-pass filter/integrator input do not affect the performance of the loop directly, but a drift on the nulling of the pickoff signal will cause a small torque on the rotor of the gyro because of the flexures.

The integrating function is combined with the low-pass filter function of an LM 308 Operational Amplifier (OP-AMP) 137 in order that the DC stability of the demodulator would be affected by only one OP-AMP for maximum DC stability. The integrating component of the filter, which integrates from DC to 3 Hz, makes the steady state stiffness of the system infinite. This nulls the pickoff signal at any applied rate of the gyroscope so that that which sets the rate limit is the maximum output current of the torquer driver rather than the limited range of the pickoff signal.

The phase response of the circuit (filter 112) is such that, while leading to a total phase lag of about 180° in the whole direct-axis loop at the nutation frequency of the gyroscope (which is in this case 184 Hz), the phase lag is minimized at frequencies near the gain crossover frequency (where the open loop gain is unity) so as to ensure the best possible stability margin.

Amplifier 130 has an input terminal 136 to which the pickoff signal, an alternating voltage signal, is applied. The signal is passed to the base of transistor 138 via a voltage divider or attenuator comprised of resistors 140 and 142 and GAIN potentiometer 144. The output of the transistor is applied to the primary of a phase splitting transformer 146 via capacitor 148 which prevents a high DC current from reaching the transformer. As shown in FIG. 4, the opposite terminals of the transformer secondary are connected to switches 150 and 152 which serve as a demodulator for demodulating the pickoff signal. The phase-splitting transformer must have a sufficient self-inductance (51 mH, one terminal to ground) to cause only a minimal phase shift of the current limited signal from the transistor. A transformer is used in the synchronous demodulator for DC stability and because it offers a good short to any DC offsets caused by 54 KHz transients from switches 150 and 152. Since there is always one of the two switches that is in the ON state, these DC offsets are effectively shorted to ground through the low resistance of the transformer and the ON switch.

Phase adjust circuit 124 shifts the phase of the pickoff reference signal so that the phase of the PO signal may be zero relative to the phase of the PO reference signal. These signals are sine waves, and for proper demodulation, they must be phased relative to each other so that their zero-crossing points occur at the same time. The phase shift is accomplished by an all-pass filter (ICI in FIG. 4), and this shift is adjusted for a given gyro. The output of the phase adjust circuit is a square wave produced by the comparator IC2 and fed to IC3c and IC3d.

Phase adjust circuit 124 includes an all-pass filter in the form of an LM 318 OP-AMP 154, which phase-shifts a 54 kHz reference signal at terminal 156, and includes an open-collector comparator 164 in the form of an LM 311 integrated circuit to convert the phase-shifted signal to a square wave, which is applied to the control input of each of analog switches 160 and 162. The phase adjust will accept a 54 KHz sine-wave signal, 5 to 6 V RMS maximum. This is the reference signal which is used for the synchronous demodulation.

Switches 160 and 162 serve as a phase splitter and are connected in such a manner as to provide two complementary square waves having coincident transitions. They are either both ON or both OFF and switch simultaneously. The state of these switches is determined by the output of comparator 164. If the signal is high the switches are ON and if it is low, the switches are OFF. Switches 150,152,160 and 162 are provided by a quad CMOS type 4066 integrated circuit used as analog switches. The use of half of the quad switch as a complementary driver for the other half of the quad switch is justified by the need to have coincident switching times. This is a requirement for good DC stability. The duty cycle need not be exactly 50%. The quad CMOS switch 4066 must be either voltage or current protected against pickoff overdrive. The transistor and phase-splitting transformer stage serves this purpose by the use of resistors at the collector and emitter of the transistor. The maximum pickoff input voltage is 9 V RMS.

With reference to FIG. 5, the output of filter/integrator 112 is applied to spin notch filter 114 the output of which is applied to the input of low pass filter 116 of direct-axis circuit 77 (or 79) as well as to the nutation notch filters 120 of cross-axis circuit 75 (or 73), as best shown in FIG. 3. Circuit 114 is a modified version of the classical "twin-tee" circuit. By tradition, the twin-tee circuit has symmetry and uses matched components. A Laplace transform analysis shows that an identical second order response could be obtained with a circuit that has no symmetry or matching. Such a circuit is employed because it is easier to adjust than the classical version. The function of the spin notch filter is to remove a small predetermined band of frequencies around the spin frequency (105 Hz) of the gyro, to eliminate the spin noise of the gyro. This noise is a characteristic of this type of gyro and is caused by a dimensional error in the rotor. The damping ratio of this filter is 0.3 and the voltage gain is unity outside of the notch frequency, and $-60$ dB to $-\infty$ dB at the notch frequency.

The purpose of Nutation Low-Pass Filter 116 is mainly to produce phase lag. It has a second order response, with a natural frequency of 114 Hz and a damping ratio of 0.7. Within certain limits, the natural frequency and the phase lag can be adjusted by adjusting the 9.2 K$\Omega$ resistor without significantly affecting the damping ratio. The phase lag of this circuit must be the same as the phase lag of the cross axis circuit (73 or 75 in FIG. 3) so that the time delay of the direct-axis loop matches the time delay of the cross-axis loop for frequencies below 60 Hz, and the sum of the phase lags must produce a phase shift of $-180°$ at the nutation frequency in the direct-axis loop. A potentiometer 166 provides frequency control and a potentiometer 168 provides for notch depth adjustment.

With reference to FIG. 6, torquer driver circuit 118 is comprised of an LM308 OP-AMP 170 and an inverting push-pull amplifier composed of various discrete components including darlington transistors 172 and 174. OP-AMP 170 attempts to overcome any difference in voltage between points A and B because of its high gain and, accordingly, the voltage at point B can be assumed to be equal to the voltage at point A. Thus, with the current in resistor 176 being virtually zero, the torquer current will be equal to the voltage at point B divided by the resistance of a precision resistor 180. Capacitor 182 is required for stabilizing OP-AMP 170.

The purpose of Torquer Driver 118 is to produce the necessary current range for the torquer coils which necessitates a large voltage range. This adds-up to a significant power and, accordingly, the transistors Q3, Q4 (172), Q5 (174) and Q6 are mounted on a heat-sink. The circuit is essentially composed of operational amplifier LM 308 (170) and an inverting push-pull amplifier which serves to "boost" the voltage and current capabilities of the operational amplifier. It will be noted that the feedback line goes into the non-inverting input of the operational amplifier. This is not a grafting error, it is because the booster is inverting and this effectively reverses the input polarities of the boosted operational amplifier. The torquer coil is connected into the circuit in such a way that the current in the resistor 180 is forced into the torquer coil. Thus, it is a transconductance amplifier, as a variation of the torquer coil resistance will not affect the current or the voltage-to-current gain of the circuit. That which determines the current in resistor 180 is the fact that the voltage gain of the circuit is unity at point B (the voltage at point B is equal to the voltage at point A). The current from the differentiator is applied to the torquer coil by point B. This current flows into the torquer coil and not into resistor 180 as it can not affect the voltage at point B for a given voltage at point A, or with the system in open loop.

With reference to FIG. 7, cross-axis circuit 73 will be seen to include a nutation notch filter 120 and a differentiator 122. One notch filter is non-inverting as shown in FIG. 7a, the other is inverting as shown in FIG. 7b. The notch filter receives its input from a spin notch filter 114 and delivers its output to the differentiator 122. It will be noted that the differentiator may not be required for some applications. The notch filters serve to eliminate an unstable zero-pole cancellation in the Laplace plane at the nutation frequency and this ensures a large degree of stability of the operation of the gyro-loop combination without any significant sacrifice of the acceleration error compensation. The differentiator produces an acceleration proportional voltage by differentiating a rate proportional voltage delivered by the nutation notch filter.

The operation of the torquer driver and cross-axis loop may best be understood by reference to FIG. 8 wherein it will be seen that the current proportional to the acceleration torque component $I\alpha_y$, where $\alpha$ means the time derivative of $\omega$ and $\omega$ is the angular rate, from the cross-axis circuit is combined with the current proportional to the precession (rate-producing) torque component ($H\omega_x$) to form the torquer coil current which is proportional to Ty, where $Ty = -H\omega_x + I\alpha_y$; and wherein it will be seen that this combination is performed in such a way that only the part of the torquer coil current that is proportional to $H\omega_x$ flows into current sensing resistor 180 where the rate information is taken, which therefore generates a voltage signal proportional to rate and rate only. Without the cross-axis circuit, the current that will flow into the current sensing resistor will be a current proportional to Ty, which is still equal to $-H\omega_x+Ia_y$, and the resulting rate information will be contaminated with the $Ia_y$ component.

As indicated, the torquer driver circuit is essentially a boosted operational amplifier, is composed of an operational amplifier integrated circuit and an inverting booster stage, behaves as an operational amplifier and is arranged to serve as a transconductance amplifier for the torquer coil output, and as a voltage follower for the rate output. Resistors R2 and R3 form a voltage divider to feed a small current into R4 that is equal to the bias current of IC7, the operational amplifier integrated circuit, so that the current in the feedback lead (from point B to the positive input of IC7) is zero. The inverting input of the booster stage is the emitter of Q1. The positive input of that stage is the base of Q1, which is connected to ground through a DC bias produced by D6 and D7. That bias has a purpose of thermal stabilisation. The booster stage itself also behaves as an operational amplifier, its input resistor is R6 and its feedback resistor is R15. Q1 acts mainly as a current source DC level shifter. Q6 is a class A amplifier which purpose is to develop the full voltage range of the torquer driver. Q2 is a current source that is the active load for Q6. Q4 and Q5 are darlington transistors that form the current amplifier stage for Q6. D8 and D9 bias Q4 and Q5 just enough so that there is no dead zone (no cross-over distortion) when conduction goes from one transistor to the other. Note that Q4 and Q5 are not completely biased. A full bias for a darlington transistor is 1.2 volt, only half that bias is provided in the circuit (0.6 volt per darlington transistor). However, this is enough because base-emitter resistors (not shown) are included in the darlington packages, so that at low currents, such a darlington transistor behaves like a standard transistor needing only 0.6 volt for minimum conduction. Because of this, stabilising emitter resistors are not required and the circuit is more thermally reliable and more efficient. Transistors Q3 and Q7 serve to assist Q4 and Q5 in sharing the voltage and power dissipation. Because of R11, R13, D11, D12, R14 and R21, the voltage on the darlington transistor is divided equally. C5, C4, C7, C6 and L1 serve to suppress a high frequency instability (20 MHz) local to each transistor. The open loop amplitude and phase response of this circuit is controlled by C1, C2, C3, R12, R23 and C8 so that the closed loop response is stable. R5, R8 and R18 are used to limit the current within a safe level in case of transients or unexpected saturations to protect the components. R24 serves to protect the gyro in case the analog output (meter) get short-circuited. R10, D10, R20, D3, D4 and D5 are used to limit the maximum current to protect the darlington transistors in case the torquer coil is short-circuited to ground. If the current in R10 is over 0.7 A, D10 steals current from 2 which limits the current in Q4, Q3 and R10. If the current in R20 is over 0.7 A, D5 steals current from Q1 which limits the current into Q6, Q5, Q7 and R20.

The purpose of the torquer driver is to produce a current in the torquer coil that is proportional to the input voltage (point A) and that is independent of the torquer coil resistance. From the point of view of the torquer coil, the circuit is a source of a constant current signal, that is, the current is independent of the voltage on the torquer coil. It is standard technology to use a constant current source to drive torquer coils because the resistance of such coils is not stable due to temperature. The output current is controlled by the input voltage and the resistor 180, the voltage gain at point B with respect to pint A is unity. The meter output must be point B rather than point A, for an accurate reading free from any voltage drifts from the operation amplifier (170).

The gain of the cross-axis loops must be zero at the nutation frequency. To adjust the notch frequency, the two resistors in the band-pass filter portion of the nutation notch filters must be adjusted without changing their ratio to each other. The use of the cross-axis loops has little effect on the closed-loop response of the system around the nutation frequency. The purpose of the cross-axis loops is to remove the "acceleration currents", in the manner explained above, from the torquer current sensing resistors. These acceleration currents will exist as part of the torquer current, and are caused by the transverse inertia of the gyro rotor during applied angular accelerations. Because these acceleration currents are supplied by the cross-axis loops, they will not flow into sensing resistor 180. The insertion of the cross-axis loops will change the effective value of the torquer current sensing resistor 180 from 15 ohms to $(1/\{([1/15]+[1/500]\})$ ohms. The voltage to current gain of the cross-axis circuit is to be adjusted to be equal to $(S/2\pi F_n)$ times the voltage to current gain of the direct-axis circuit.

It will be seen that the linearity of the rebalance loop of the present invention depends on only one component, precision resistor 180 and, accordingly, the linearity of the loop is essentially the high linearity of the resistor. The circuit achieves high static stability because no current other than the torquer current flows through precision resistor 180. The circuit achieves high dynamic stability because the phase lag control is known to be very safe and stable and the use of notch filters in the cross-loops ensures high stability because of the complete suppression of the unstable zero-pole cancellation. The configuration used for the cross-axis loop not only improves the dynamic damping and the gain margin, it also completely removes the acceleration error, a feature not seen in previous loop designs.

The embodiments of the invention in which an exclusive property of privilege is claimed are defined as follows:

1. A rebalance loop for a dry tuned rotor gyroscope having a rotor moveable about two orthogonal axes, means associated with one of said axes for producing an electrical error signal when a rate is applied to said one of said axes, means associated with the other of said axes for producing an electrical error signal when a rate is applied to said other of said axes, first means responsive to a first torque control signal for applying a torque to said rotor about one of said axes for restoring said rotor to a null position about said one of said axes and second means responsive to a second torque control signal for applying a torque to said rotor about the other of said axes for restoring said rotor to a null position about said other of said axes and said rebalance loop comprising:
first direct-axis circuit means responsive to one of said error signals for producing a first rate proportional torque signal and delivering said first rate proportional torque signal to said first means;
second direct-axis circuit means responsive to the other of said error signals for producing a second rate proportional torque signal and delivering said second rate proportional torque signal to said second means;

first cross-axis circuit means responsive to said one of said error signals for producing a first acceleration proportional torque signal and delivering said first acceleration proportional torque signal to said second means; and second cross-axis circuit means responsive to said other of said error signals for producing a second acceleration proportional torque signal and delivering said second acceleration proportional torque signal to said first means.

2. A rebalance loop as defined in claim 1, each said direct-axis circuit means including a nutation low-pass filter means for introducing a phase lag into a filtered input signal and torquer driver means for receiving and amplifying the output of said filter means and said acceleration proportional torque signal and producing said torque control signal.

3. A rebalance loop as defined in claim 2, said torquer driver means including an operational amplifier and an inverting push-pull amplifier for amplifying the output of said operational amplifier, said operational amplifier being adapted to receive, at its inverting input, said output of said filter means and, at its non-inverting input, the signal received at a return line from said means responsive to a first torque control signal and said acceleration proportional torque signal from its associated cross-axis circuit means.

4. A rebalance loop as defined in claim 1, each said cross-axis circuit means including a nutation notch filter and a differentiator for differentiating the output of said nutation notch filter and producing one of said acceleration proportional signals.

5. A rebalance loop as defined in claim 2, each said cross-axis circuit means including a nutation notch filter and a differentiator for differentiating the output of said nutation notch filter and producing one of said acceleration proportional signals.

6. A rebalance loop as defined in claim 1, further including:

a first front-end circuit means associated with said first direct-axis circuit means and said second cross-axis circuit means adapted to receive said one of said error signals and a second front-end circuit means associated with said second direct-axis circuit means and said first cross-axis circuit means adapted to receive said other of said error signals, each said front-end circuit means including an AC amplifier for amplifying one of said error signals, a demodulator for demodulating said error signal, a low pass filter for filtering said demodulated error signal, an integrator for integrating said output of said filter, and a spin notch filter for filtering the output of said integrator and delivering an input signal to its associated direct-axis circuit means and cross-axis circuit means.

7. A rebalance loop as defined in claim 6, said low pass filter being arranged to provide a minimized phase delay at frequencies near the gain crossover frequency where the open loop gain is unity and to provide a predetermined amount of phase lag at the nutation frequency of the gyroscope.

8. A rebalance loop as defined in claim 6, further including a phase splitting transformer for minimizing the DC offset and drift of said demodulator, said transformer having a primary winding connected to the output of said AC amplifier and a secondary connected to said demodulator.

9. A rebalance loop as defined in claim 6, further including means for applying a reference signal to said demodulator.

10. A rebalance loop as defined in claim 9, said reference signal being a sine wave, and said means being adapted to convert said sine wave signal to a square wave, further including means for splitting said square wave and applying two complementary square waves having coincident transitions to said demodulator.

11. A rebalance loop as defined in claim 6, wherein said integrator being adapted to integrate the filtered output of said demodulator from DC to 3 Hz so as to make the steady state stiffness of the system infinite.

12. A rebalance loop as defined in claim 5, said torquer driver means including an operational amplifier and four darlington transistors adapted to receive the output of said operational amplifier.

13. A rebalance loop for a dry tuned rotor gyroscope having a rotor moveable about two orthogonal axes, means associated with one of said axes for producing an electrical error signal when a rate is applied to said one of said axes, means associated with the other of said axes for producing an electrical error signal when a rate is applied to said other of said axes, a first torquer coil responsive to a first torque control signal for applying a torque to said rotor about one of said axes for restoring said rotor to a null position about said one of said axes and a second torquer coil responsive to a second torque control signal for applying a torque to said rotor about the other of said axes for restoring said rotor to a null position about said other of said axes, said rebalance loop comprising;

first front-end circuit means for demodulating one of said error signals, filtering any residual carrier signal and spin noise from said one error signal, introducing a first predetermined amount of phase lag into said one error signal, and integrating said one error signal whereby to produce a first filtered and integrated signal;

second front-end circuit means for demodulating the other of said error signals, filtering any residual carrier signal and spin noise from said other of said error signal, introducing a first predetermined amount of phase lag into said other error signal, and integrating said other error signal whereby to produce a second filtered and integrated signal;

first cross-axis circuit means for filtering from said second filtered and integrated signal a predetermined band of frequencies centered on the nutation frequency of said gyroscope and differentiating said signal whereby to produce a first acceleration proportional torque signal;

second cross-axis circuit means for filtering from said first filtered and integrated signal a predetermined band of frequencies centered on the nutation frequency of said gyroscope and differentiating said signal whereby to produce a second acceleration proportional torque signal;

first direct-axis circuit means responsive to said first filtered and integrated signal for adding thereto a second predetermined amount of phase lag by a first nutation low-pass filter whereby to produce a first rate proportional torque signal and responsive to said first acceleration proportional torque signal to combine said first rate proportional torque signal and said first acceleration proportional torque signal to produce a first torque control signal and convert said first torque control signal in a first torquer driver to a form capable of driving said first torquer coil;

second direct-axis circuit means responsive to said second filtered and integrated signal for adding thereto a second predetermined amount of phase lag by a second nutation low-pass filter whereby to produce a second rate proportional torque signal and responsive to said second acceleration proportional torque signal to combine said second rate proportional torque signal and said second acceleration proportional torque signal o produce a second torque control signal and convert said second torque control signal in a second torquer driver to a form capable of driving said second torquer coil;

said first torquer driver including an operational amplifier and an inverting push-pull amplifier for amplifying the output of said operational amplifier, said operational amplifier being adapted to received, at its inverting input, an output of said first nutation low-pass filter and, at its non-inverting input, the signal received at a return line from an output terminal of said first torquer coil to which output a signal from the second cross-axis circuit means is applied; and said second torquer driver including a further operational amplifier and a further inverting push-pull amplifier for amplifying the output of said further operational amplifier, said further operation amplifier being adapted to receive, at its inverting input, an output of said second nutation low-pass filter and, at its noninverting input, the signal received at a return line from an output terminal of said second torquer coil, to which output a signal from the first cross-axis circuit means is applied.

14. A rebalance loop as defined in claim 13, further including a first precision resistor connected between said output terminal of said first torquer coil and ground and wherein said signal thereat is a voltage and a second precision resistor connected between said output terminal of said second torquer coil and ground and wherein said signal thereat is a voltage.

* * * * *